United States Patent
Silverman et al.

(10) Patent No.: US 6,838,614 B2
(45) Date of Patent: Jan. 4, 2005

(54) HYDRAULIC AND ELECTRIC UMBILICAL CONNECTION FOR AN INSPECTION VEHICLE FOR INSPECTING A LIQUID-FILLED TANK

(75) Inventors: Eugene B. Silverman, Ellicott City, MD (US); David L. Gilbert, Laurel, MD (US); Richard Skallos, Severna Park, MD (US); Joel L. Lautenschlager, Glen Burnie, MD (US)

(73) Assignee: AST Services, LLC, Danbury, CT (US)

( * ) Notice: Subject to any disclaimer, the term of this patent is extended or adjusted under 35 U.S.C. 154(b) by 0 days.

(21) Appl. No.: 10/241,004

(22) Filed: Sep. 10, 2002

(65) Prior Publication Data

US 2004/0045379 A1 Mar. 11, 2004

(51) Int. Cl.[7] ............................. H01B 7/34; E21B 17/00
(52) U.S. Cl. ...................................... 174/36; 166/242.3
(58) Field of Search ..................... 174/36, 15.1, 102 R, 174/113 R, 115, 117 M, 47; 166/242.3, 242.2; 138/118, 118.1, 124, 127, 131, 134, 138, 110, 112

(56) References Cited

U.S. PATENT DOCUMENTS

| | | | | |
|---|---|---|---|---|
| 4,158,104 A | * | 6/1979 | Ross ....................... 174/117 M |
| 4,229,613 A | * | 10/1980 | Braun ......................... 174/47 |
| 4,281,211 A | * | 7/1981 | Tatum et al. .................. 174/36 |
| 4,559,411 A | * | 12/1985 | Piper ...................... 174/117 M |
| 4,567,917 A | * | 2/1986 | Millard ...................... 138/126 |
| 4,599,712 A | * | 7/1986 | Chelminski .................. 367/144 |
| 4,746,769 A | * | 5/1988 | Piper ...................... 174/117 M |
| 4,777,859 A | | 10/1988 | Plummer, Jr. |
| 4,836,080 A | | 6/1989 | Kite, III et al. |
| 5,102,727 A | * | 4/1992 | Pittman et al. .............. 442/187 |
| 5,205,174 A | | 4/1993 | Silverman et al. |
| 5,349,991 A | * | 9/1994 | Okawa et al. ............... 139/391 |
| 5,373,103 A | * | 12/1994 | Orr, Jr. et al. ................ 174/36 |
| 5,380,954 A | * | 1/1995 | Orr, Jr. .................... 174/117 M |
| 5,613,522 A | * | 3/1997 | Ford et al. ................... 138/123 |
| 5,690,014 A | | 11/1997 | Larkin |
| 5,769,045 A | * | 6/1998 | Edwards et al. ........ 123/184.61 |
| 5,813,106 A | * | 9/1998 | Haug et al. ................... 29/429 |
| 5,902,958 A | * | 5/1999 | Haxton ........................ 174/47 |
| 5,908,049 A | * | 6/1999 | Williams et al. ............ 138/125 |
| 6,104,970 A | | 8/2000 | Schmidt, Jr. et al. |
| 6,283,206 B1 | * | 9/2001 | Fraser et al. ............. 166/242.3 |
| 2002/0170727 A1 | * | 11/2002 | Holland et al. ............... 174/19 |

FOREIGN PATENT DOCUMENTS

| | | |
|---|---|---|
| DE | 29 23 286 A1 | 12/1979 |
| GB | 2 211 266 | 6/1989 |

* cited by examiner

*Primary Examiner*—William H. Mayo, III
(74) *Attorney, Agent, or Firm*—David M. Rosenblum

(57) ABSTRACT

An umbilical connection for use in a hazardous environment like a floating roof storage tank has one or more hydraulic hoses, one or more electrical cables or a combination thereof. Each hydraulic hose has a static dissipative and abrasion resistant covering. Each electrical cable has an abrasion resistant coating. The hoses and cables are bundled and wrapped in a static dissipative and abrasion resistant open mesh sheath or an overbraid to form the umbilical connection.

18 Claims, 2 Drawing Sheets

HYDRAULIC AND ELECTRIC UMBILICAL CONNECTION FOR AN INSPECTION VEHICLE FOR INSPECTING A LIQUID-FILLED TANK

This invention relates to an umbilical connection that includes one or more hydraulic lines and one or more electric lines or wire harnesses linking a robotic inspection vehicle deployed in a liquid-filled tank to a control station located outside such tank. The hydraulic and electric lines and the umbilical connection formed from a plurality of such lines have static dissipative sheathing to prevent spark generation that could lead to explosions when the inspection vehicle is deployed in flammable or other hazardous environments, such as the vapor space above a floating roof in a floating roof storage tank for gasoline or other hydrocarbon fuels.

BACKGROUND OF THE INVENTION

A floating roof storage tank generally has a solid cylindrical outer wall covered by a solid sloped or dome-shaped roof. A floating roof is held within the volume defined by the outer wall and roof. The floating roof extends over the liquid contents held within the volume, and forms a vapor seal around the internal circumference of the cylindrical wall. The height within the tank at which the floating roof is positioned varies according to the amount of liquid being stored within the tank at any given time.

Floating roof storage tanks generally are used to store flammable liquids, such as gasoline. A vapor space is formed inside the tank, between the floating roof covering the gasoline and the outer tank roof. Vapors emitted from the internal volume of the storage tank are collected in the vapor space to prevent significant amounts of vapor from being expelled to the atmosphere outside the tank. Environmental protection regulations restrict the amount of hydrocarbon vapors that may be released to the atmosphere. Air quality may be impacted adversely if hydrocarbon vapor emissions exceed permitted amounts.

Manual access to the internal volume of the tank is provided within the vapor space. One or more access ports or doorways are formed in the roof or outer wall of the tank, and a ladder or gangway may be supported within the vapor space. Persons may enter the vapor space to service the tank, the internal floating roof and any equipment housed inside the tank. Because of the hazards associated with confined space entry within the vapor space, particularly in flammable atmospheres, entry for inspection purposes is rarely permitted.

UL 913-1988 sets forth the standards that must be satisfied before equipment may be introduced into a floating roof storage tank or the vapor space above the floating roof in such tank. "Intrinsically safe" apparatus are protected against ignition by (1) limiting the maximum current and voltage that may be applied so that the energy available in a hazardous location is not capable of igniting the flammable mixture in such location; and (2) taking precautions against spark ignition and thermal ignition.

Special precautions are taken when introducing equipment into the internal volume of the floating roof storage tank when the tank volume holds a flammable liquid, such as gasoline. Measures are taken to prevent sparks and associated combustion of flammable vapors. Measures are also taken to minimize the amount of time the seal between the flammable liquid and the vapor space above the floating roof is broken to prevent substantial amounts of flammable vapors from being emitted into the vapor space.

Floating roof storage tanks are inspected at regular intervals to locate cracks, corrosion or other defects that might lead to tank failure. Environmental protection regulations specify the frequency and recommended procedures for inspecting tanks for structural integrity. One method involves introducing a remote controlled submersible vehicle into the tank while the tank remains in service. For example, U.S. Pat. No. 5,205,174 discloses a scavenger submersible vehicle that inspects the internal surfaces of a liquid filled tank using a video camera and/or ultrasound pulses. One or more umbilical hose(s) and wire harness(es) connect the remote-controlled vehicle to its power source and air or vacuum source, and further provide a link for transmitting navigation and inspection data from the vehicle to one or more computers located outside the tank.

Known hydraulic hoses formed from rubber or nylon reinforced thermoplastics are not "intrinsically safe" because excessive heat energy builds from friction as the hose surface contacts the pulley or the surfaces of the internal floating roof tank when the inspection vehicle is deployed into the tank. In addition, rubber materials may degrade in caustic chemical environments. Known PTFE hydraulic hoses can withstand caustic environments, but have not been found conductive enough to dissipate static charges. When such PTFE hoses are covered with a metallic braided outer sheath, such as stainless steel, to increase conductivity, they have also been found unsafe because the braided sheath scrapes or punctures the coatings over electrical cables bundled together with the hydraulic hoses in an umbilical connection. Moreover, the stainless braid can also scrape the surfaces of the internal floating roof, generating a spark or building up heat toward possible ignition in the vapor space.

The umbilical cord connection to a robotic inspection vehicle generally includes a bundle of hydraulic hoses and electrical cables wrapped in an outer sheath. To meet "intrinsically safe" standards, the sheath itself should be static dissipative, should not build up heat from frictional forces as the cord is deployed through a vapor space or hazardous environment, and should not abrade or damage the materials covering the hoses and cables within the sheath. Prior sheathing materials have not satisfied these rigorous requirements.

SUMMARY OF THE INVENTION

In a first aspect of the invention, a sheath for covering a hydraulic hose has a length substantially co-extensive with the length of the hose and has a plurality of polymeric strands woven or braided with at least one electrically conductive strand, such that the electrically conductive strand extends along the length of the sheath. The electrically conductive strand helps to dissipate dynamic and static charges that may build up along the surface of the sheath when the hydraulic hose is moved. The polymeric strands in the sheath preferably are formed from a material selected from the group consisting of: polytetrafluoroethylene, polyester, ethylene-tetrafluoroethylene, and other fluoropolymers, liquid crystal polymer fibers, nylon, and combinations of these materials. The at least one electrically conductive strand preferably is formed from a material selected from the group consisting of: copper, brass, gold, and platinum. Copper is the most preferred.

If the sheath is formed as an overbraid over the hydraulic hoses, the plurality of polymeric strands together with the at least one electrically conductive strand preferably form a bias weaving having a braid angle in the range of 45 to 80 degrees, most preferably 50 to 65 degrees. A most-preferred overbraid is a triaxial or multi-axial overbraid having the plurality of polymeric strands together with the at least one electrically conductive strand forming a bias weaving with a braid angle in the range of 45 to 80 degrees and with a second plurality of polymeric strands extending axially within the overbraid.

In a second aspect of the invention, a sheath envelops or wraps around one or more hydraulic hoses, or electrical cables, or a combination of hydraulic hoses and electrical cables to form an umbilical connection that may link hydraulically or electrically powered equipment with a control station. The sheath of the umbilical connection has an open mesh or braid formed from a first plurality of polymeric strands, a second plurality of polymeric strands, and one or more electrically conductive strands, such that said electrically conductive strand or strands extends along the length of the sheath. The electrically conductive strand or strands serve to dissipate the dynamic or static charges that build along the length of the umbilical connection as the umbilical connection is moved or comes into contact with metal surfaces. Preferably, the first and second pluralities of polymeric strands are made from a material selected from the group consisting of: polytetrafluoroethylene, polyester, ethylene-tetrafluoroethylene, and other fluoropolymers, liquid crystal polymer fibers, nylon, and combinations of these materials. The polymeric strands in the first plurality may be the same material or a different material from the polymeric strands in the second plurality. The first plurality of polymeric strands most preferably are nylon-coated polymeric fiber, and the second plurality of polymeric strands most preferably are liquid crystal polymer fibers. The at least one electrically conductive strand preferably is formed from a material selected from the group consisting of: copper, brass, gold, and platinum. Copper is the most preferred electrically conductive material.

The outer sheath of the umbilical connection may be formed as a triaxial or multi-axial braid in which the first plurality of polymeric strands form a bias weaving together with the one or more electrically conductive strands, and the second plurality of polymeric strands extends axially, such that when the sheath is installed around the hoses the second plurality of polymeric strands extends along such length. In such a preferred construction, the first plurality of polymeric strands are formed from nylon-coated polymeric fiber, the second plurality of polymeric strands are liquid crystal polymer fibers and the electrically conductive strand(s) are copper. The braid angle preferably is in the range of 45 to 80 degrees, and gaps preferably are left between the strands in the braid. With such braid with gaps, liquids that contact the umbilical connection will more rapidly drain away from the umbilical connection when the umbilical connection emerges from a liquid containing tank or other liquid environment.

Most preferably, the umbilical connection is used to connect equipment, such as an inspection vehicle deployed into a hazardous environment, with control and analytic systems outside the hazardous environment. The invention also includes a method for inspecting a liquid-containing storage tank, in which an inspection vehicle is deployed into the tank and such vehicle is linked to a source of hydraulic and/or electric power with an umbilical connection according the invention as described above. Tank liquids drain rapidly away from the umbilical connection with the open mesh or braid sheath around the bundle of hoses and/or cables. Rapid draining and rapid evaporation of hazardous chemicals after the vehicle has been removed from a storage tank means the less exposure to hazardous conditions and more rapid removal of the equipment. The umbilical connection also dissipates static charges and limits heat build up from frictional contact, making it intrinsically safe for use with inspection vehicles deployed within floating roof storage tanks.

DESCRIPTION OF THE PREFERRED EMBODIMENTS

Figure 1:
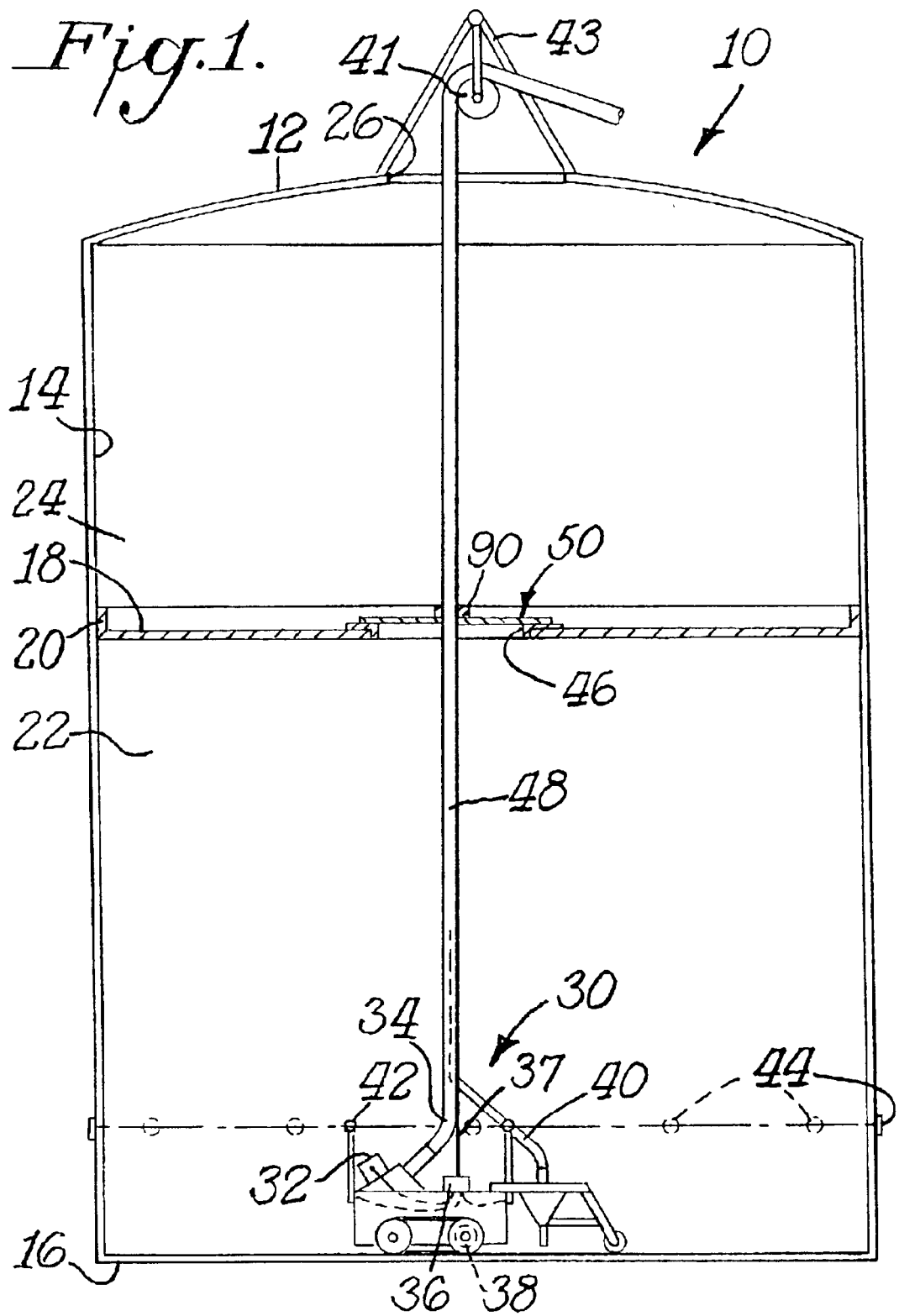
FIG. 1 is a schematic front elevational view of a floating roof storage tank into which a remote-controlled inspection vehicle has been deployed, showing an umbilical connection linking the vehicle to pumping and control equipment (not shown) outside the tank.

Referring first to FIG. 1, a floating roof storage tank 10 has a sloped or dome-shaped roof 12 over a cylindrical side wall 14 and a floor 16. The floating roof storage tank 10 includes a floating roof 18 separating the liquid 22 within the liquid holding volume from the vapor space 24 above the liquid holding volume. The floating roofs most frequently are formed from aluminum. A vapor seal 20 is formed at the edges of the floating roof 18 and contacts the internal wall of the side wall 14 to limit or prevent vapors from a volatile liquid stored in the tank from escaping the liquid holding volume under the floating roof 18.

For the tank shown in FIG. 1, a manway access port 26 through the roof 12 provides access to the vapor space 24 above the floating roof 18 for inspection and maintenance personnel. The tank may include one or a series of ladders (not shown) adjacent the internal side wall 14 of the tank leading from the access port 26 to the upper surface of the floating roof 18.

As shown in FIG. 1, an inspection vehicle 30 has been introduced into the liquid holding volume within the floating roof tank 10. The vehicle 30 traverses along the internal surface of the floor 16 to inspect the floor 16 for cracks or corrosion that could lead to tank failure. The vehicle 30 is equipped with a camera 32 to transmit video signals to a computer (not shown) located outside the tank 10. The vehicle 30 is hydraulic motor 38 controlled and is provided an electronic control module 36 that is linked via electric cable within an umbilical connection 37 to a power source (not shown) located outside the tank 10. The vehicle 30 is also equipped with sensors (sonic transducers) 42 that communicate with transducers 44 mounted in an array on the outer surface of the side wall 14 of the tank 10. The sensors 42 and transducers 44 transmit and/or receive signals, and the data from the sensors is transmitted to a computer (not shown) located outside the tank, which computer analyzes such data to determine the position of the vehicle within the tank 10. The vehicle 30 is also provided with a blower and blower line 40 and a vacuum or suction line 34 that work independently or in combination to clear away debris from the internal surface of the floor 16 prior to inspecting that surface. Additional details about inspection vehicles and the means for operating and navigating such vehicles are shown in U.S. Pat. Nos. 5,205,174 and 5,627,800, the disclosures of which are incorporated herein by reference.

Hydraulic tubing forming a suction line 34 in combination with a blower line 40 is joined with one or more cables for transmitting electric signals to the vehicle and transmitting electric signals back to the computer. The tubing and blower line and cable(s) together form an umbilical cord 48 that is installed over a pulley 41. As shown in FIG. 1, the pulley 41 is mounted to a tripod 43 installed over the outer roof 12. The umbilical cord 48 may have sufficient strength to hold the vehicle 30 as it is lowered into the liquid holding volume inside the tank 10 and when it is lifted out of the liquid holding volume inside the tank 10. Alternatively, a tether rope (not shown) may be attached to the vehicle 30 and strung through the pulley 41 to assist with lowering the vehicle 30 into the tank 10 and lifting the vehicle 30 from the tank 10.

A hatchway 46 is provided through the floating roof 18. The vehicle 30 preferably has a height and width that allow the vehicle to be passed through the hatchway 46 when the existing hatch cover provided on the floating roof 18 has been removed. It is also possible to install a second tripod with a pulley (not shown) on the floating roof 18 and over the hatchway 46 where the internal floating roof has sufficient stability to support such weight.

Figure 2:
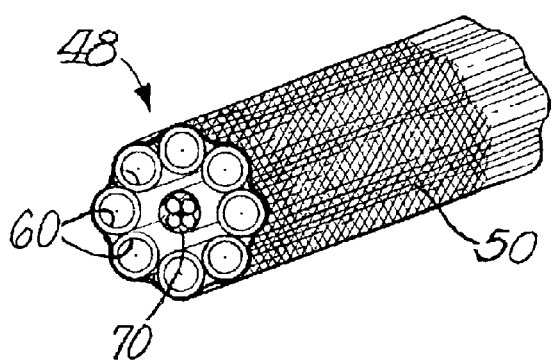
FIG. 2 is a perspective view of the umbilical connection according to the invention.

Referring next to FIG. 2, the umbilical connection or cable 48 between the vehicle and the hydraulic pump and electronic controls is shown in greater detail. In this example, the umbilical connection 48 comprises a bundle of a plurality of hydraulic hoses 60 and an electrical cable 70, positioned in parallel and closely adjacent to one another. The bundle of hoses 60 and cable 70 is encased within an open mesh sheath 50.

Figure 3:
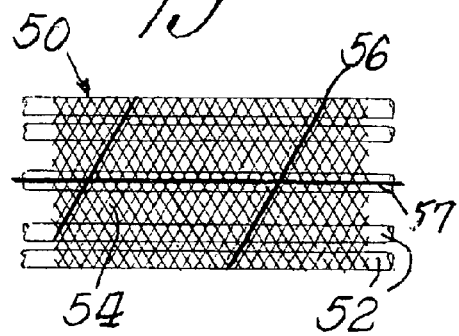
FIG. 3 is a side elevational view showing the mesh sheath covering the umbilical connection of FIG. 2.

Referring next to FIG. 3, the sheath 50 is braided in the form of a triaxial braid having a series of substantially straight parallel axial or longitudinal polymeric strands 52 within a braided grid of polymeric strands 54 and at least one electrically conductive strand 56. The axial polymeric strands 52 are held in the sheath in spaced apart, parallel relation. The polymeric strands 54 and electrically conductive strand(s) 56 are braided or woven in an open weave or bias braid pattern to leave spaces or gaps between the strands such that the lengths of the hydraulic hoses 60 adjacent to the sheath remain visible therethrough. The braid angle shown in FIG. 3 is 60 degrees. The gap size between the strands may vary according to design preferences.

A plurality of axially extending electrically conductive strands 57 may be incorporated into the sheath adjacent to the polymeric strands 52. Moreover, the polymeric strands 52 may be supplemented with additional polymeric strands located adjacent thereto. The additional polymeric strands may be formed from the same or different polymeric material as the polymeric strands 52.

The materials forming the sheath should be resistant to chemical attack and have high tensile strength. The polymeric strands 54 resist stretching, cracking and tearing. The polymeric strands 54 preferably are made from polytetrafluoroethylene, polyester, ethylene-tetrafluoroethylene, and other fluoropolymers, liquid crystal polymer fibers, nylon, and combinations of these materials. Most preferably, the polymeric strands 54 are made from nylon-coated VECTRAN® liquid crystal polymer. The VECTRAN® polymeric fibers are offered by Celanese Acetate LLC of Charlotte, N.C. Nylon-coated polymeric fibers can be obtained from Cortland Cable of Cortland, N.Y.

The axially extending polymeric strands 52 are formed from polytetrafluoroethylene, polyester, ethylene-tetrafluoroethylene, and other fluoropolymers, liquid crystal polymer fibers, nylon, and combinations of these materials. Preferably, the polymeric strands 52 are formed from VECTRAN® liquid crystal polymer. Other alternatives for such strands 52 are KEVLAR® para-aramid polymer fiber or TEFLON® PTFE coated strands. The polymeric strands 52 may be formed from the same or different polymer materials as the polymeric strands 54 in the sheath 50. The axially extending polymeric strands 52 also resist chemical attack and resist stretching, cracking and tearing.

The electrically conductive strands 56, 57 are formed from static dissipative materials that preferably have sufficient electrical conductivity to prevent substantial build up of static charges along the surface of the sheath. Preferably, the electrically conductive strands have less than 1 ohm resistance end to end, and a surface resistivity of less than 10 ohm/square. Preferred electrically conductive or static dissipative materials include copper, brass, gold, and platinum.

The umbilical connection and sheath will be exposed for various chemicals and flammable materials that are stored in storage tanks, including but not limited to, gasoline, diesel fuel, kerosene, methanol and naptha. The materials selected for the polymeric strands and the electrically conductive strands should be resistant to corrosion within these chemicals and flammable materials.

The open mesh sheath 50 permits chemicals and flammable materials to drain rapidly from the umbilical connection when the umbilical connection is removed from a liquid filled tank. Thus, the open mesh sheath 50 having gaps between the strands as shown in FIGS. 2 and 3 is significantly preferred where the umbilical connection is to be introduced into hazardous environments, such as liquid chemical or gasoline storage tanks.

Figure 4:
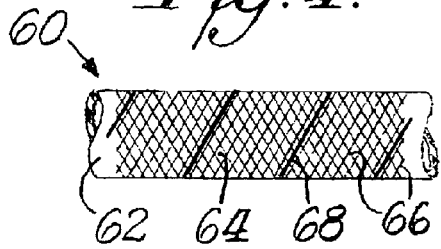
FIG. 4 is a side elevational view of a hydraulic hose covered with a static dissipative sheath according to the invention.

As shown in FIG. 4, each hydraulic hose 60 has a tubular hose 62 encased or covered with a braided covering 64. The braided covering 64 is braided or woven from polymeric strands 66 combined with at least one electrically conductive strand 68. Most preferably, at least two electrically conductive strands are included in the covering. The covering 64 may also be completely formed from electrically conductive strands 68. The polymeric strands may comprise polytetrafluoroethylene, polyester, ethylene-tetrafluoroethylene, and other fluoropolymers, liquid crystal polymer fibers, nylon, and combinations of these materials. The conductive strands may comprise copper, brass, gold, and platinum. In the preferred embodiment, the polymeric strands are VECTRAN® liquid crystal polymer fiber, and the conductive strand is copper. Another preferred embodiment has polymeric strands of a modified ethylene-tetrafluoroethylene fluoropolymer sold under the brand name TEFZEL® by E. I. DuPont de Nemours & Co., Wilmington, Del.

Because the covering 64 must dissipate static charges if the hydraulic hose is introduced into a hazardous environment, the conductive strands should extend along the entire length of the hose. The conductive strands 68 should have sufficient electrical conductivity to prevent substantial build up of static charges along the surface of the hydraulic hose, whether generated by movement of fluids within the hose or by movement of the hose. Preferably, the electrically conductive strands 68 have less than 1 ohm resistance end to end, and a surface resistivity of less than 10 ohm/square. The covering 64 must not abrade or crack after being exposed to repeated abrasive forces, nor be damaged by chemicals or flammable materials, so the fibrous strands and conductive strands should be able to withstand such exposure.

Figure 5:
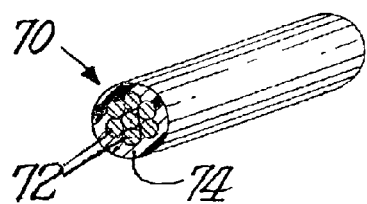
FIG. 5 is a perspective view of an electrical cable covered with a static dissipative coating according to the invention.

Each electrical cable 70 has one or more cables or wires 72 encased by a polymeric coating 74 as shown in FIG. 5. The polymeric coating must resist chemical attack and damage from abrasive forces. It is important for the polymeric coating to remain integral over the cables or wires so that the current through such wires is fully insulated from any hazardous environments. Suitable polymeric coating materials include polytetrafluoroethylene, polyester, ethylene-tetrafluoroethylene, and other fluoropolymers. A particularly preferred polymeric coating is a modified ethylene-tetrafluoroethylene fluoropolymer sold under the brand name TEFZEL® by E.I. DuPont de Nemours & Co., Wilmington, Del.

The umbilical connection 48 can be repeatedly introduced into and removed from hazardous environments, such as above ground or below ground tanks for chemical storage or internal floating roof storage tanks storing gasoline or other petrochemicals. The covering for the hydraulic hoses and the covering for the electrical cables are intrinsically safe. These coverings, combined with the open mesh sheath for wrapping a bundle of hydraulic hoses and electrical cables, form an umbilical connection that can be safely deployed into the vapor space of an internal floating roof storage tank and into the volume of such tank holding chemicals or petroleum products. The umbilical connection has particular application for delivering hydraulic and electric power to a robotic inspection vehicle deployed to inspect the surfaces of the tank while the tank remains in service.

EXAMPLE

The Table below sets out a strand composition for a triaxial overbraid sheath for an umbilical connection.

the number of yarn bobbins per carrier. "FT/LB" refers to the number of feet of each yarn in one pound. "PPI" is an abbreviation for picks per inch. This is the number of yarn crossing per inch as running lengthwise along the braid. "EPI" is an abbreviation for ends per inch. "Yarn centerline spacing" is the accumulation of yarn diameter plus gap size between the yarns.

The "Hot Melt" is an adhesive strand incorporated preferably within the axial yarns. The hot melt adhesive is activated to help hold the open-weave overbraid in the desired configuration and with the desired spacing between the bias yarns. "0.008" copper" refers to copper wire incorporated into the bias and axial yarns in the braid.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. A sheath for a combination of one or more hydraulic hoses and one or more electrical cables that together form an umbilical connection, comprising:
an open mesh or braid formed from a first plurality of polymeric strands, a second plurality of polymeric strands, and one or more electrically conductive strands, such that said electrically conductive strand or strands extends along the length of the sheath, and wherein the hose(s) and the cable(s) forming the umbilical connection are aligned to form a bundle and such bundle generally defines an outer circumference, and wherein the sheath extends substantially around the outer circumference of the bundle.

2. The sheath of claim 1, wherein the hoses have a length and the braid is a triaxial braid in which the first plurality of polymeric strands form a bias weaving together with the one or more electrically conductive strands, and the second plurality of polymeric strands extends axially such that when

|  | Bias Nylon coated VECTRAN ® | Bias 0.008" copper | Axial Hot melt adhesive | Axial 0.008" copper | Axial KEVLAR ® |
|---|---|---|---|---|---|
| Diameter | 2.75 | 2.75 | 2.75 | 2.75 | 2.75 |
| Angle | 62.0 | 62.0 | 0 | 0 | 0 |
| Raw yd/lb | 1100 | 1754 | 2390 | 1754 | 3144 |
| Carrier | 76 | 4 | 40 | 40 | 40 |
| Ends per carrier | 1 | 1 | 2 | 1 | 1 |
| Fiber density | 0.052 lb/in3 | 0.322 lb/in3 | 0.041 lb/in3 | 0.322 lb/in3 | 0.052 lb/in3 |
| Part fiber volume | 50% | 50% | 50% | 50% | 50% |
| One layer thickness | 0.0182 | 0.0001 | 0.0058 | 0.0001 | 0.0016 |
| Percent coverage | 59.7% | 1.2% | 20.3% |  | 10.4% |
| oz/yd2 | 9.8 | 0.3 | 2.5 |  | 0.8 |
| FT/LB | 20.42 | 618.6 | 89.6 | 131.6 | 235.8 |
| PPI | 8.7 | 0.4 | 0.0 | 0.0 | 0.0 |
| EPI | 9.8 |  |  |  |  |
| Yarn centerline spacing | 0.102 |  |  |  |  |
| Gap size | 0.0625 |  |  |  |  |

As reported in the Table above, the "Diameter" is the nominal outer diameter of the finished braid. The "Angle" represents the angle of the bias yarns in relation to the axial yarns. The angle is reported in degrees. The "Carrier" concerns the total number of yarns of a particular type running in the same direction. "Ends per carrier" concerns the sheath is installed around the hoses the second plurality of polymeric strands extends along such length.

3. The sheath of claim 1, wherein the first plurality of polymeric strands are made from a material selected from the group consisting of: polytetrafluoroethylene, polyester, ethylene-tetrafluoroethylene, and other fluoropolymers, liquid crystal polymer fibers, nylon, and combinations of these materials.

4. The sheath of claim 1, wherein the second plurality of polymeric strands are made from a material selected from the group consisting of: polytetrafluoroethylene, polyester, ethylene-tetrafluoroethylene, and other fluoropolymers, liquid crystal polymer fibers, nylon, and combinations of these materials.

5. The sheath of claim 1, wherein the at least one electrically conductive strand is formed from a material selected from the group consisting of: copper, brass, gold, and platinum.

6. The sheath of claim 1, wherein the first plurality of polymeric strands are nylon-coated polymeric fiber, the second plurality of polymeric strands are liquid crystal polymer fibers, and the at least one electrically conductive strand is copper.

7. The sheath of claim 1, wherein the sheath is formed as a triaxial overbraid having the first plurality of polymeric strands together with the at least one electrically conductive strand forming a bias weaving with a braid angle in the range of 45 to 80 degrees and with the second plurality of polymeric strands extending axially within the overbraid.

8. An umbilical connection for equipment deployed into a hazardous environment, comprising:
a combination of one or more hydraulic hoses and one or more electrical cables aligned to form a bundle having a first end for connection to equipment deployed into a hazardous environment; and
a sheath of an open mesh or braid formed from a first plurality of polymeric strands, a second plurality of polymeric strands, and one or more electrically conductive strands, such that said electrically conductive strand or strands extends along the length of the sheath, wherein said sheath is wrapped around the bundle to form the umbilical connection.

9. The umbilical connection of claim 8, wherein each hydraulic hose is individually encased with a covering having a length, said covering formed from (a) a third plurality of polymeric strands separate from the polymeric strands of the sheath; and (b) at least one electrically conductive strand woven with the polymeric strands (a) such that said electrically conductive strand extends along the length of the covering.

10. The umbilical connection of claim 9, wherein polymeric strands in the third plurality of polymeric strands in the covering are formed from a material selected from the group consisting of: polytetrafluoroethylene, polyester, ethylene-tetrafluoroethylene, and other fluoropolymers, liquid crystal polymer fibers, nylon, and combinations of these materials.

11. The umbilical connection of claim 9, wherein the electrically conductive strand in the covering is formed from a material selected from the group consisting of: copper, brass, gold, and platinum.

12. The umbilical connection of claim 8, wherein each electrical cable is individually covered with a coating of a polymeric material selected from the group consisting of: polytetrafluoroethylene, polyester, ethylene-tetrafluoroethylene, and other fluoropolymers, liquid crystal polymer fibers, nylon, and combinations of these materials.

13. The umbilical connection of claim 8, wherein the sheath is formed as a triaxial braid in which the first plurality of polymeric strands form a bias weaving together with the one or more electrically conductive strands, and the second plurality of polymeric strands extends axially, such that when the sheath is installed around the hoses, the second plurality of polymeric strands extends along such length.

14. The umbilical connection of claim 8, wherein the first plurality of polymeric strands in the sheath are made from a material selected from the group consisting of: polytetrafluoroethylene, polyester, ethylene-tetrafluoroethylene, and other fluoropolymers, liquid crystal polymer fibers, nylon, and combinations of these materials.

15. The umbilical connection of claim 8, wherein the second plurality of polymeric strands in the sheath are made from a material selected from the group consisting of: polytetrafluoroethylene, polyester, ethylene-tetrafluoroethylene, and other fluoropolymers, liquid crystal polymer fibers, nylon, and combinations of these materials.

16. The umbilical connection of claim 8, wherein the at least one electrically conductive strand in the sheath is formed from a material selected from the group consisting of: copper, brass, gold, and platinum.

17. The umbilical connection of claim 8, wherein the first plurality of polymeric strands in the sheath are nylon-coated polymeric fiber, the second plurality of polymeric strands in the sheath are liquid crystal polymer fibers, and the at least one electrically conductive strand in the sheath is copper.

18. The umbilical connection of claim 8, wherein the sheath is formed as a triaxial overbraid having the first plurality of polymeric strands together with the at least one electrically conductive strand forming a bias weaving with a braid angle in the range of 45 to 80 degrees and with the second plurality of polymeric strands extending axially within the overbraid.

* * * * *